Figure 1:
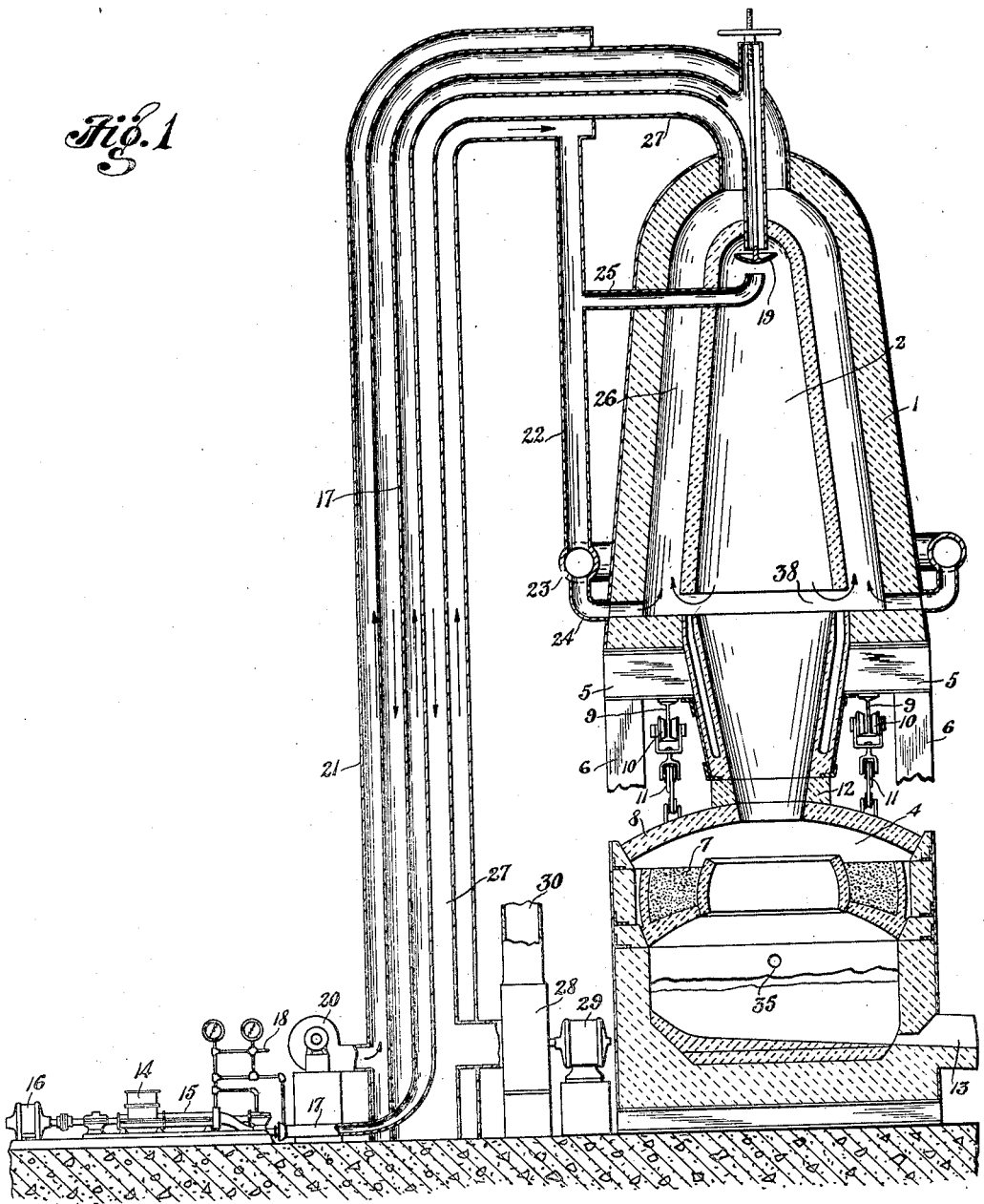

March 5, 1929.  T. F. BAILY  1,704,029

REDUCTION PROCESS AND APPARATUS

Filed March 6, 1926  2 Sheets-Sheet 1

Inventor

T. F. Baily

By Frease and Bond

Attorneys

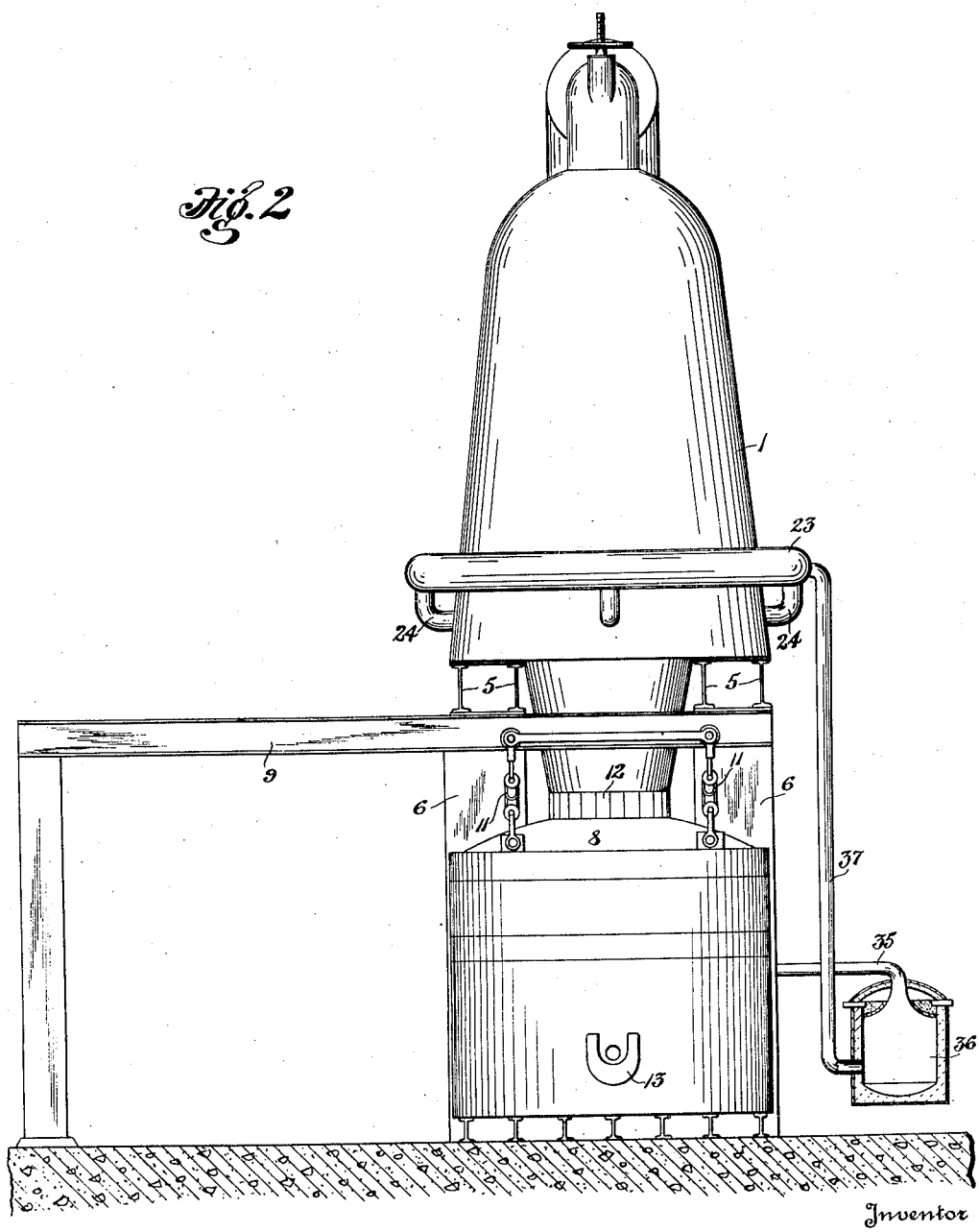

Patented Mar. 5, 1929.

1,704,029

UNITED STATES PATENT OFFICE.

THADDEUS F. BAILY, OF ALLIANCE, OHIO.

REDUCTION PROCESS AND APPARATUS.

Application filed March 6, 1926. Serial No. 92,693.

This invention relates to a process and apparatus for reducing ores and oxides used as ores, in which the oxides, carbon for reduction, if used in the solid state, and flux if required, are finely pulverized and aerated or floated in an air blast and forced under pressure into the upper end of a stack type furnace comprising a reduction chamber and a receiving or melting chamber communicating with the lower reduced end thereof.

The object of the improvement is to provide means for introducing the finely pulverized charge under pressure into the upper end of a stack type furnace, carrying off the waste gases at a point intermediate the top and bottom of the reduction chamber of the furnace passing said heated gas around the incoming charge to preheat the same, forcing additional air for combustion around said heated gas and into the reduction chamber; a receiving or melting chamber being provided beneath the reduction chamber for receiving the reduced ore and maintaining the same in molten condition if desired.

An embodiment of the invention is illustrated in the accompanying drawings, in which Figure 1 is a vertical sectional view through the improved furnace and apparatus, and Fig. 2, a front elevation of the furnace, showing a condenser attached thereto.

Similar numerals refer to similar parts throughout the drawings.

The furnace comprises the stack portion 1 within which is located the reduction chamber 2, spaced from the outer wall of the stack and communicating through the reduced lower end with the receiving or melting chamber 4.

The entire stack portion of the furnace may be supported upon the beams 5 mounted upon posts 6, the bosh being suspended therefrom as shown.

The receiving or melting chamber 4 is preferably heated by means of an annular carbon resistor 7 and in order to recharge said resistor the roof 8 of the melting furnace may be removable.

Rails 9 may be suspended from the supporting beams 5 to receive trolleys 10 which are connected by means of a hoist 11.

A course of removable brick, indicated at 12, may be provided between the lower end of the bosh and the removable roof of the melting chamber. By removing this course of brick the roof may be raised, by means of the hoist, and moved upon the track, clear of the top of the melting chamber, to permit access to the resistor trough.

The lower end of the melting chamber may be provided with a pouring spout 13 which may be kept normally closed by a plug or the like in order to retain the reduced metal in molten state and pour the same as desired, or this chamber may be provided with a hopper to receive residue or reduced material without melting.

The pulverized ore, carbon if solid, and flux if necessary are fed in the proper proportions into the hopper 14 and carried, by means of a pump 15, driven as by the motor 16, into the charging pipe 17, air or a reducing gas under pressure being admitted, from any suitable source, at 18, the finely divided charge being thus aerated or floated in a gas blast and forced under pressure through the pipe 17 into the upper end of the reducing chamber, which may be provided with the feed valve 19.

Air for combustion is forced by means of the fan 20, through the conduit 21 and pipe 22 to the bustle pipe 23, provided with tuyères 24 which convey the air into the combustion chamber surrounding the reduction chamber 2. The reduction chamber is maintained under slightly greater pressure than the combustion chamber.

If desired, additional air may be conveyed to the upper portion of the reduction chamber as by the branch pipe 25.

The volatile products of the reaction are carried off at the lower end of the reduction chamber and upward through the combustion chamber 26 to the exhaust pipe 27, which is preferably located around the incoming charge pipe 17 and within the air pipe 21 thus preheating both the charge and the air for combustion by the gas.

The volatile products, if they carry a substance that it is desired to recover, may be carried through the pipe 35 to the top of the condenser 36 when such constituent may be recovered by condensing or precipitation, the remaining combustible gas being carried by the pipe 37 to the combustion chamber 26.

These burned gases are thrown off at the lower end of the pipe 27 through a fan 28, driven as by the motor 29 being exhausted as at 30 to the stack.

In the event that ores especially rich in phosphorus or sulphur are to be used, the ore may be given a preliminary treatment in the furnace, to remove the surplus sulphur or phosphorus in the form of gas, before the reduction process is completed, in which case the temperature of the charge will be above the volatilization temperature of such elements and may be below the reduction temperature of the main constituent of the ore.

This may be accomplished by charging the hopper 14 with the finely pulverized ore, without any flux or carbon for reduction, and forcing the same, in the manner above described through the charge pipe 17 into the upper end of the stack, the phosphorus or sulphur, in the form of gas, being drawn off from the reduction chamber through the discharge pipe 27, and conveyed to any suitable receiving container. It should be understood that in this purification process of the ore the reduction or reaction chamber of the furnace should be heated to a temperature sufficient to volatilize the impurities in the ore, but below the reduction temperature of the main constituent of the ore, in which case a portion of the gases, if they are of a combustible nature may be introduced around the lower part of the furnace, as in the bosh, and below the gas take-off 38.

The ore thus treated may then be mixed with the flux and carbon for reduction and reduced in the furnace as above described.

In the case of iron reduction, for instance, the lower portion of the reduction chamber should be maintained at a temperature of approximately 2000° Fahrenheit while the melting chamber should operate at substantially 3000° Fahrenheit.

In the case of ores that volatilize in the reduction furnace, such as zinc, the circumferential opening leading from the reduction chamber to the combustion chamber 26 may be closed so that the gases formed in the reduction operation are removed from the reduction chamber by the pipe 35, and conducted to the condenser 36 where the volatile product is condensed to the molten state and the combustible gas, other than the product to be removed is conducted by the pipe 37 to the combustion chamber 26; and in the case of removal and recovery of impurities, such as phosphorus from iron ore, the same method of operation may be used condensing the gaseous phosphorus or precipitating the gaseous phosphoric oxide in the condenser utilized as a precipitator, the other gases being conducted to the combustion chamber 26 or recuperator tube 27.

I claim:

1. A shaft type furnace having a reduction chamber and a melting chamber beneath the reduction chamber, means for introducing the materials of the charge in a pulverized condition at the top of the reduction chamber, openings substantially at the bottom of the reduction chamber for removing the gaseous products of reaction of the reduction operation, means for heating each of said chambers and means for burning the gaseous products of the reduction operation for preheating the charge.

2. A shaft type furnace having a reduction chamber and a melting chamber beneath the reduction chamber, means for introducing the materials of the charge in a pulverized condition at the top of the reduction chamber, openings substantially at the bottom of the reduction chamber for removing the gaseous products of reaction of the reduction operation and means for heating each of said chambers, means for burning gaseous products of the reduction operation for preheating air for combustion.

3. A shaft type furnace having a reduction chamber and a melting chamber beneath the reduction chamber, means for introducing the materials of the charge in a pulverized condition at the top of the reduction chamber, openings substantially at the bottom of the reduction chamber for removing the gaseous products of reaction of the reduction operation and means for heating each of said chambers, means for burning the gaseous products of the reduction operation for preheating the charge and air for combustion in the reduction chamber.

4. A shaft type furnace having a reduction chamber and a melting chamber beneath the reduction chamber, means for introducing the materials of the charge in a pulverized condition at the top of the reduction chamber, openings substantially at the bottom of the reduction chamber for removing the gaseous products of reaction of the reduction operation, means for heating each of said chambers and means for burning the gaseous products of reaction on the outside of the reduction chamber.

5. A shaft type furnace having a reduction chamber and a melting chamber beneath the reduction chamber, means for introducing the materials of the charge in a pulverized condition at the top of the reduction chamber, openings substantially at the bottom of the reduction chamber for removing the gaseous products of reaction of the reduction operation, means for heating each of said chambers, means for burning the gaseous products of reaction on the outside of the reduction chamber and means for passing the products of combustion, after they leave the furnace, around the supply line of the incoming charge in opposite direction.

6. A shaft type furnace having a reduction chamber and a melting chamber beneath the reduction chamber, means for introducing the materials of the charge in a pulverized condition at the top of the reduction chamber, openings substantially at the bottom of the reduction chamber for removing the gaseous products of reaction of the reduction operation, means for heating each of said chambers, means for burning the gaseous products of reaction on the outside of the reduction chamber and means for passing the products of combustion to a preheating chamber for incoming air.

7. A shaft type furnace having a reduction chamber and a melting chamber beneath the reduction chamber, means for introducing the materials of the charge in a pulverized condition at the top of the reduction chamber, openings substantially at the bottom of the reduction chamber for removing the gaseous products of reaction of the reduction operation, means for heating each of said chambers, means for burning the gaseous products of reaction on the outside of reduction chamber and means for passing the products of combustion, after they leave the furnace, around the supply line of the incoming charge and to a preheating chamber for incoming air in the opposite direction.

8. A shaft type furnace having a reduction chamber and a melting chamber beneath the reduction chamber, means for introducing the materials of the charge in a pulverized condition at the top of the reduction chamber, openings substantially at the bottom of the reduction chamber for removing the gaseous productions of the reaction of the reduction operation, means for heating each of said chambers, a recuperator, and means for passing the products of combustion to the recuperator for preheating the air and charge.

9. A shaft type furnace comprising an upper chamber for reduction, a bosh communicating with the lower part of the reduction chamber, a melting chamber below the bosh communicating with the lower end of the bosh, a removable roof on the melting chamber, provided with an opening communicating with the lower portion of the bosh, the bosh being supported independently of the roof of the furnace in rigid position, and a removable section between the lower end of the bosh and the roof so that when the removable section is removed the roof may be raised and removed laterally.

10. A shaft type furnace including an upper portion and a lower portion, the upper portion being supported independently of the lower portion, a removable roof on the lower portion of the furnace and a removable section between the roof and upper portion of the furnace.

11. The combination of a shaft type furnace for performing thermal reactions and provided with a reaction chamber and a combustion chamber surrounding the same, an aerating pump for feeding materials to the reaction chamber and means for removing gaseous products from the reaction chamber and conducting them to the combustion chamber.

12. A shaft type furnace having a reduction chamber, a receiving chamber beneath the reduction chamber, and a combustion chamber surrounding the reduction chamber, means for introducing the material of the charge in a pulverized condition at the top of the reduction chamber, an opening into the receiving chamber for removing gaseous products of the reaction of the reduction operation, and a condenser connected to said opening and connecting with the combustion chamber.

In testimony that I claim the above, I have hereunto subscribed my name.

THADDEUS F. BAILY.